(No Model.)

9 Sheets—Sheet 1.

S. L. WORSLEY.
METAL SCREW MACHINE.

No. 424,527. Patented Apr. 1, 1890.

Figure 1:
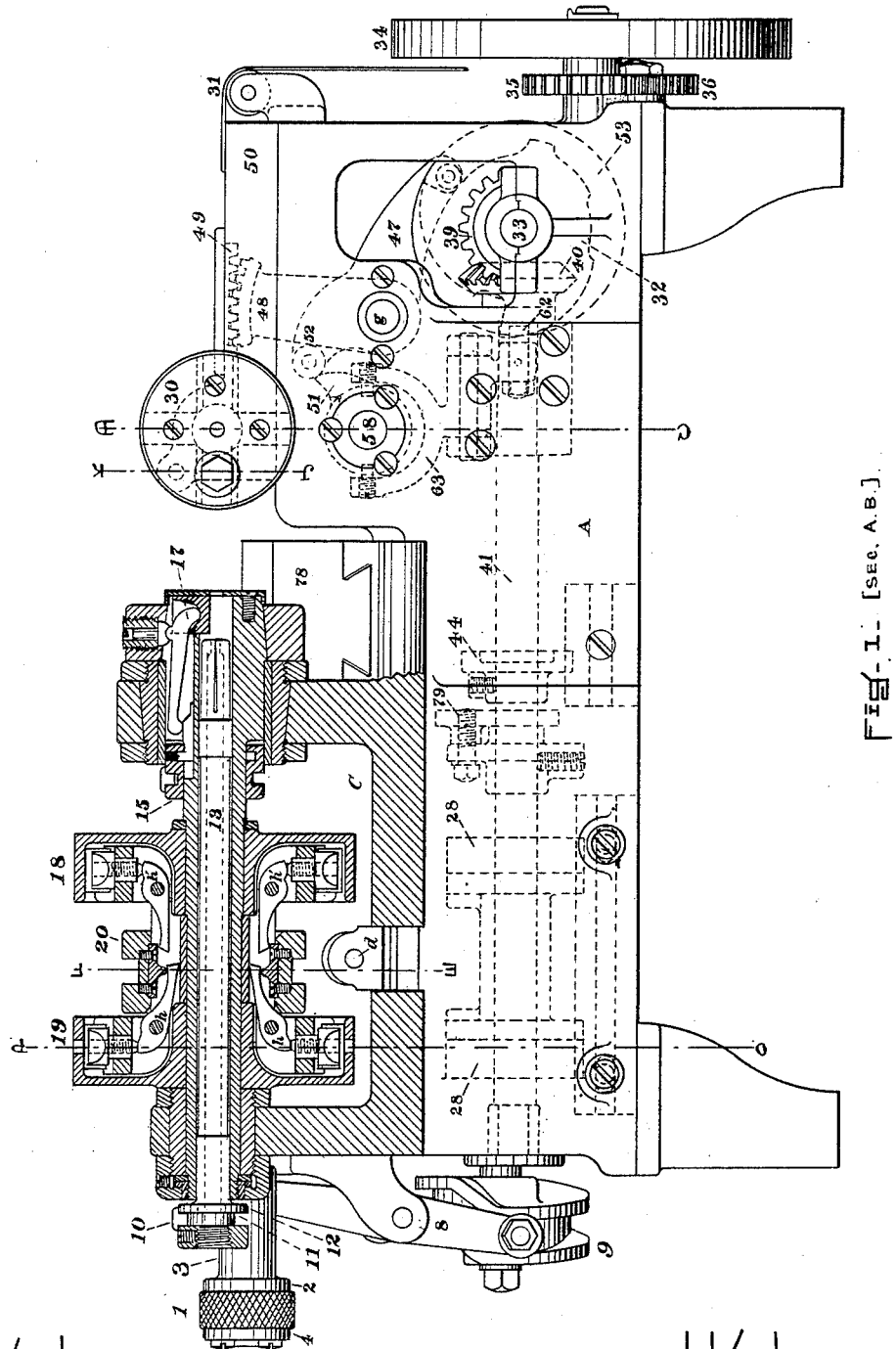

Fig. 1. [SEE. A.B.]

WITNESSES.
W. H. Thurston
S. J. Murphy.

INVENTOR
Sam'l L. Worsley (No Model.) 9 Sheets—Sheet 2.
S. L. WORSLEY.
METAL SCREW MACHINE.
No. 424,527. Patented Apr. 1, 1890.
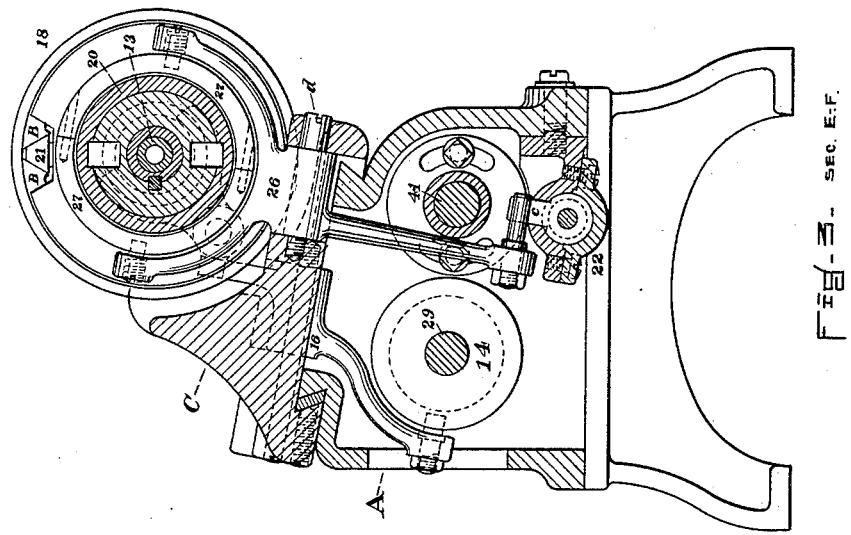
Fig. 3. SEC. E-F.
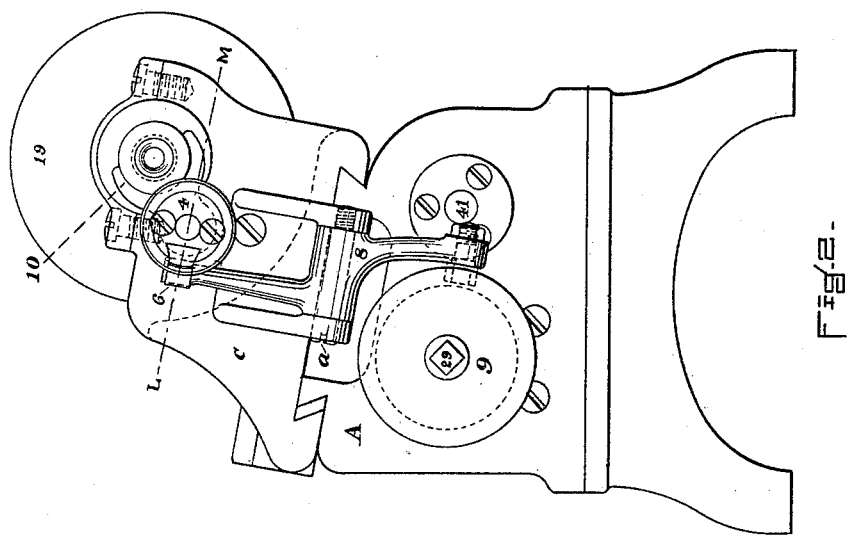
Fig. 2.
Witnesses.
W. H. Thurston
S. J. Murphy
Inventor
Saml. L. Worsley

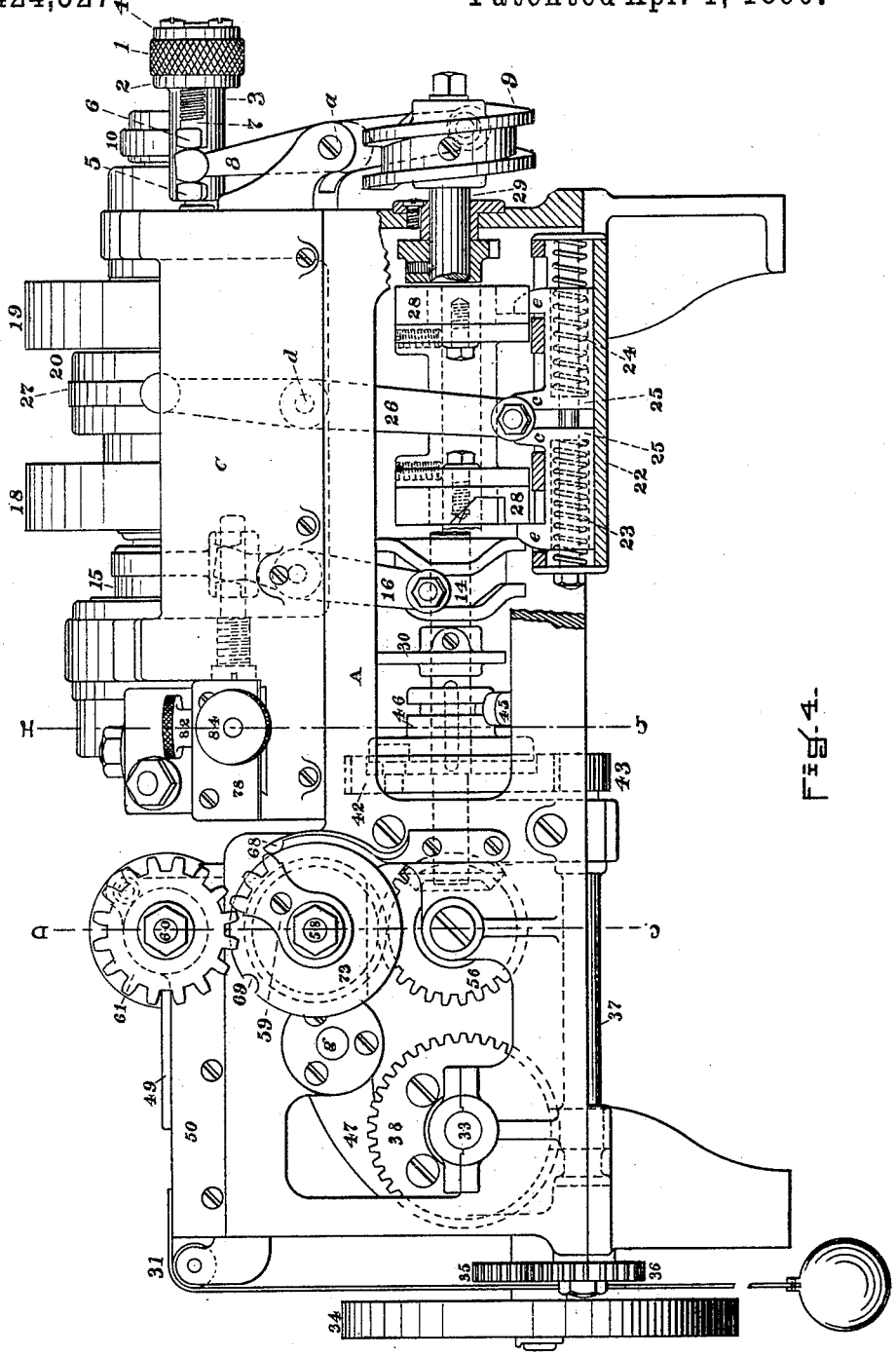

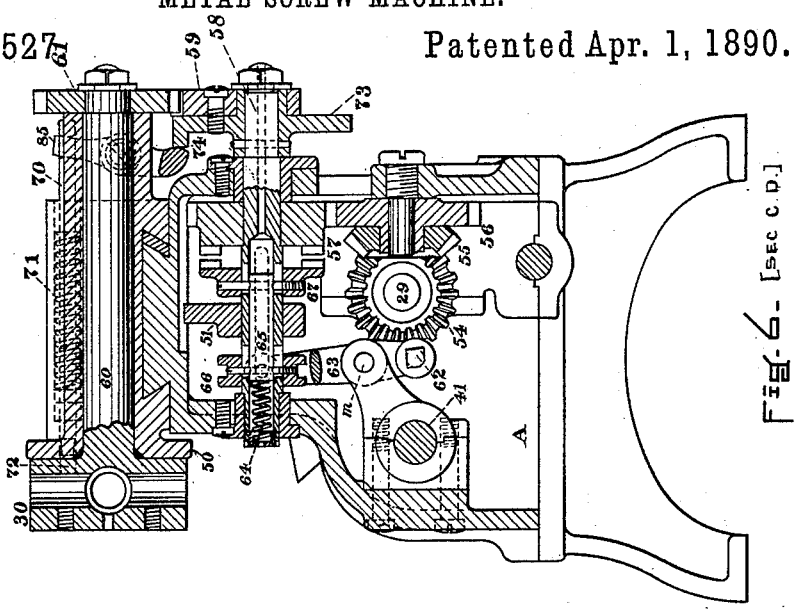

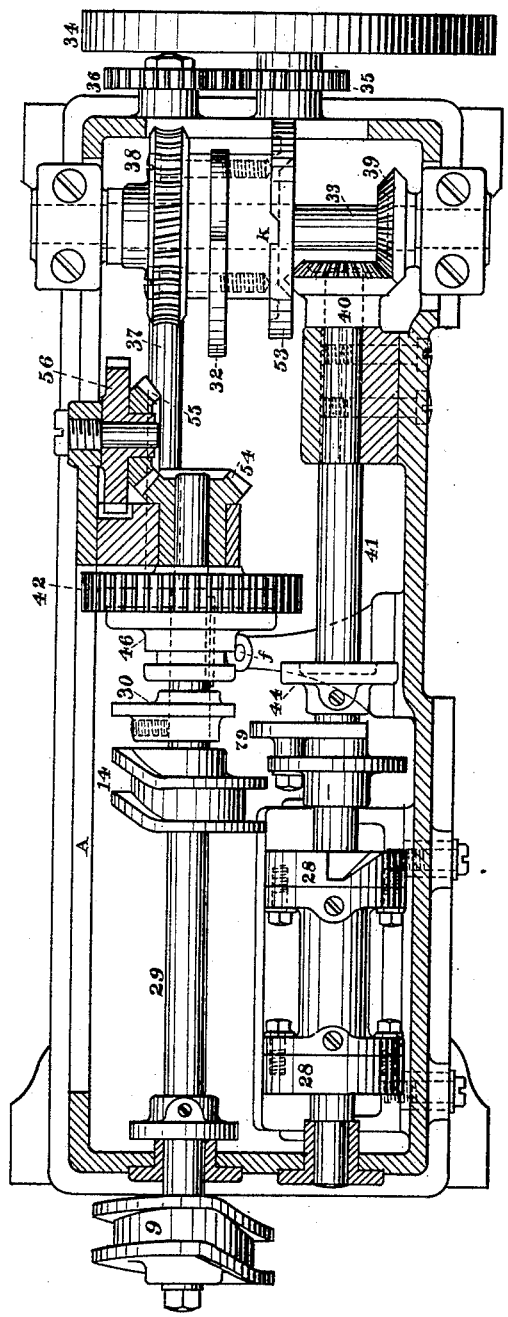

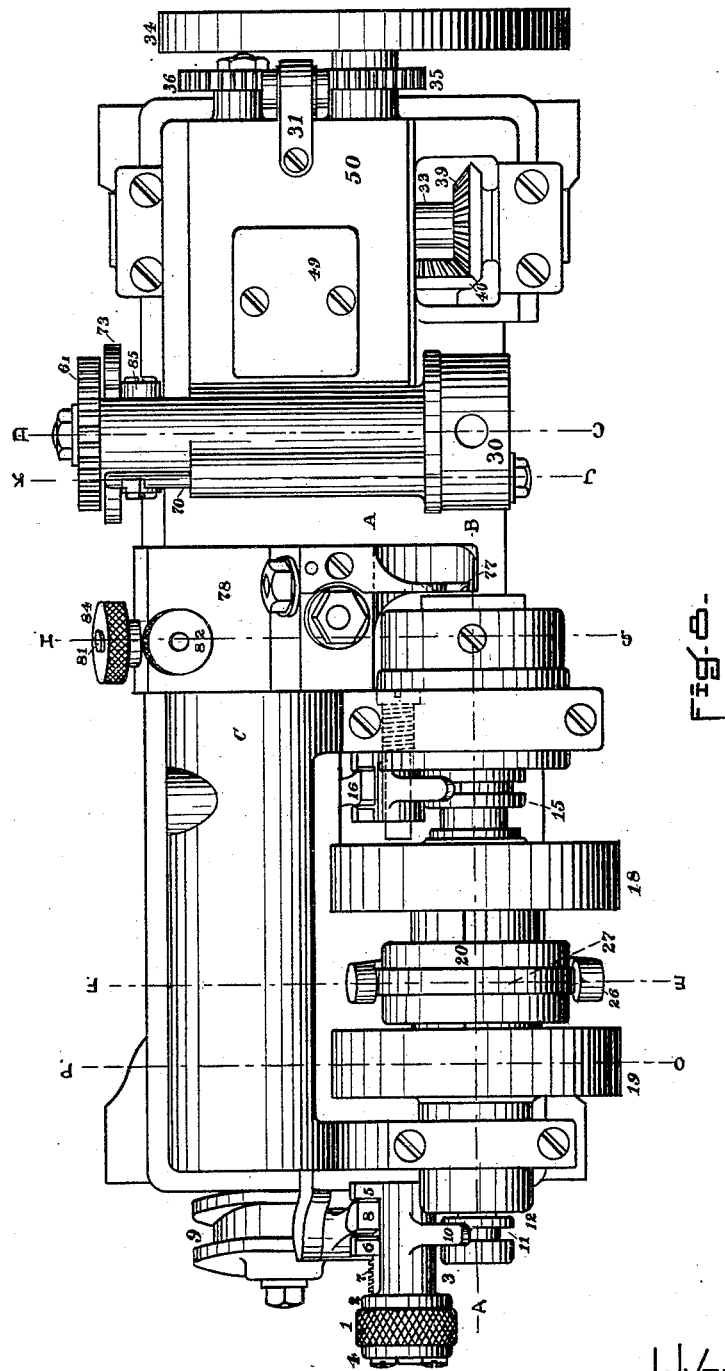

(No Model.)  9 Sheets—Sheet 7.
S. L. WORSLEY.
METAL SCREW MACHINE.
No. 424,527.  Patented Apr. 1, 1890.
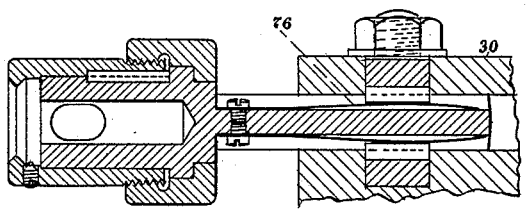
Fig-7-
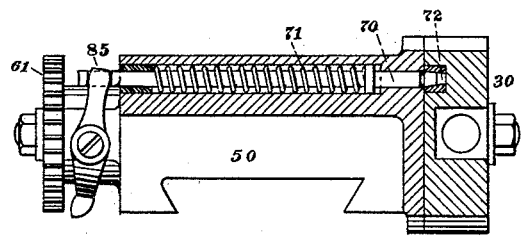
Fig-10- [SEC. J.K.]
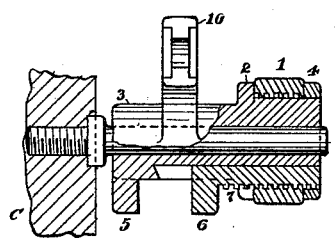
Fig-11- [SEC. L.M.]
WITNESSES.
W. H. Thurston
S. J. Murphy.
INVENTOR
Saml. L. Worsley (No Model.)
S. L. WORSLEY.
METAL SCREW MACHINE.
No. 424,527.  Patented Apr. 1, 1890.
9 Sheets—Sheet 8.
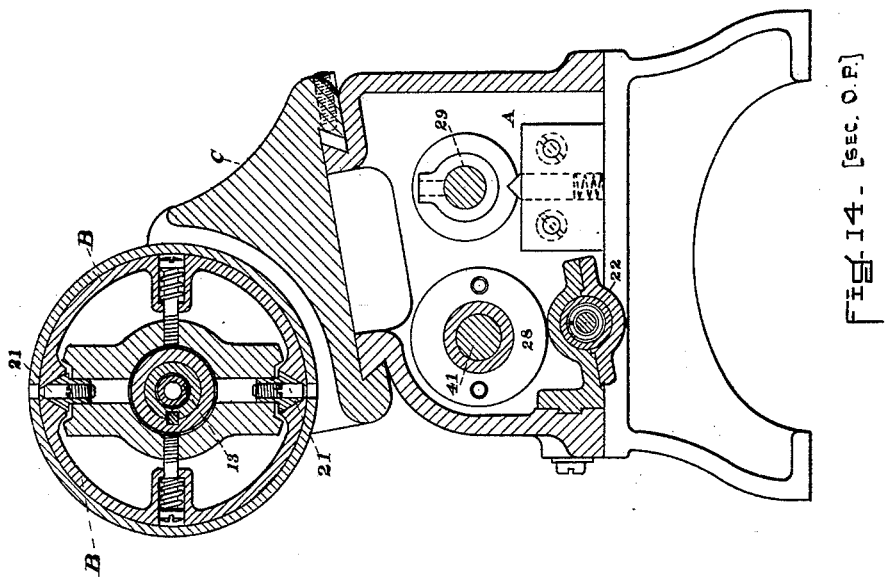
Fig. 14. [SEC. O.P.]
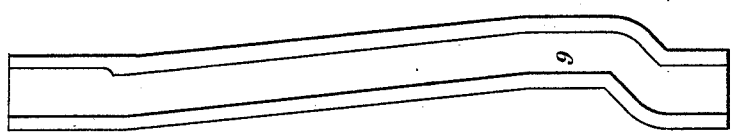
Fig. 13.
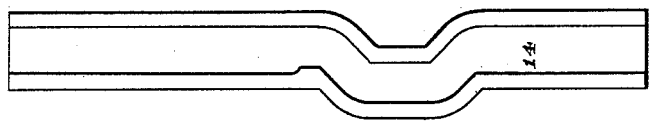
Fig. 12.
WITNESSES.
W. H. Thurston
S. J. Murphy
INVENTOR
Saml. L. Worsley
N. PETERS, Photo-Lithographer, Washington, D. C.

(No Model.) 9 Sheets—Sheet 9.

S. L. WORSLEY.
METAL SCREW MACHINE.

No. 424,527. Patented Apr. 1, 1890.

WITNESSES
H. H. Thurston
S. J. Murphy

INVENTOR
Saml. L Worsley

UNITED STATES PATENT OFFICE.

SAMUEL L. WORSLEY, OF TAUNTON, MASSACHUSETTS, ASSIGNOR TO THE BROWN & SHARPE MANUFACTURING COMPANY, OF PROVIDENCE, RHODE ISLAND.

METAL-SCREW MACHINE.

SPECIFICATION forming part of Letters Patent No. 424,527, dated April 1, 1890.

Application filed June 3, 1889. Serial No. 312,941. (No model.)

*To all whom it may concern:*

Be it known that I, SAMUEL L. WORSLEY, of Taunton, in the county of Bristol and Commonwealth of Massachusetts, have made certain new and useful Improvements in Metal-Screw Machines; and I do hereby declare that the following specification, taken in connection with the several sheets of drawings, making a part of the same, is a full, clear, and exact description thereof.

The functions which are performed by my machine are the same as those which have been heretofore accomplished by other machines for the same general purpose—that is to say, a rod of stock is intermittingly fed forward for the prescribed distance required to make a screw of given length and is held in the jaws of a revolving chuck, a sufficient length of the same projecting beyond the face of such chuck. A series of tools for performing the operations of milling a shank on the rod and cutting a thread thereon are mounted radially in an intermittingly-revolving turret-head, so that the series of tools shall be brought into action to perform their respective offices successively and in regular order, and, lastly, devices for cutting off the screw when finished from the rod of stock.

My improvements hereinafter described are intended to accomplish a great simplification in this class of machines and to increase their productive capacity very greatly over previously-known machines; and to this end I have made various new combinations and peculiarities of construction, hereinafter particularly specified, and recited in the claims.

One feature which is peculiar in my machine and tends greatly to increase its range of capacity for cutting screws of different lengths without accompanying loss of time in changing gears, &c., to make such adaptations resides in the means by which the extent to which the rod of stock shall be fed forward through the axis of the holding-chuck to determine the length of the screw to be cut can be varied at pleasure by the simple manipulation to the right or to the left of a milled wheel without interrupting the operation of the machine.

Another feature of my machine consists in the combination of devices for instantaneously reversing the movements of the spindle carrying the revolving chuck, so as to enable the threading-die, after it has done its work, to be run off the thread which it has cut by the employment of a spring-actuated friction-clutch for effecting the changes in the direction of rotation of the chuck-spindle. Cotemporaneously, too, with the reversal of the direction of rotation of the chuck, and while it is causing the threading-die to be run off, the cutting-off tool for severing the screw from the rod is brought into action.

Another feature of my machine which accomplishes a great economy in time consists in mounting the revolving spindle carrying the chuck, its pulleys for driving it in opposite directions alternately, its friction-clutches for inducing movements in opposite directions, the means for adjusting the extent to which the rod of stock shall be fed, and the slide which carries the cutting-off tool all on the head-stock of the machine, whereby this head-stock with these adjuncts can be constructed so as to slide on ways on the bed of the machine and be adjusted at pleasure, according to the length of the screw to be made, so as to have the least space possible existing between the end of the rod of stock and the faces of the tools mounted in the turret-head, and thereby reduce to a minimum the space through which the milling-tools and the threading-tool in the turret-head are required to move to reach the end of the stock to perform their offices without regard to the circumstance whether a long or a short screw is being made.

Another feature of my machine consists in the employment of a cam-shaft which has an intermittent rotary motion, and upon which are mounted the appropriate cams for giving a backward movement to the cutting-off tool, for releasing the gripping-jaws, for feeding forward the stock, for operating the closing of the gripping-jaws in the chuck, and for moving back the feeding-tube for taking a new grip upon the rod of stock, whereby a high rate of speed can be given to this shaft to perform these effects, which would be impossible in the event that such shaft was continually rotating to enable other effects to be performed by cams thereon giving movement to other members of the machine, as in prior machines of this class. Such shaft in my machine executes one revolution for inducing all the effects above mentioned, and then pauses in its rotation until it is again called into action. Consequently a high rate of speed can be given to this shaft relatively to the movement of other independent cam-shafts for working other portions of the machine where an equal rapidity of movement would be injurious. I also carry out the same idea by combining an intermittently-revolving shaft, which induces the successive partial rotations of the tool-carrying turret-head with the prime-motor shaft of the machine by a clutch-connection automatically operated, whereby I am enabled to make the turret-head change rapidly when the time is reached for such changes, and at a rate of speed which would be impossible if the shaft governing such changes were all the time in connection with the prime-motor shaft.

Various other minor features and combinations will be hereinafter pointed out and specified in the claims.

Figure 15:
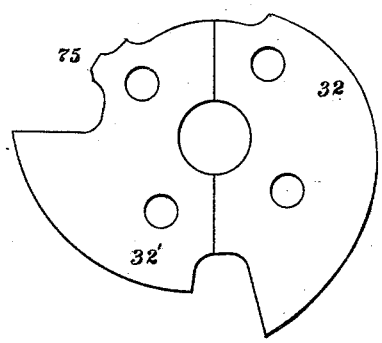
Figure 16:
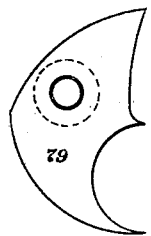
Figure 17:
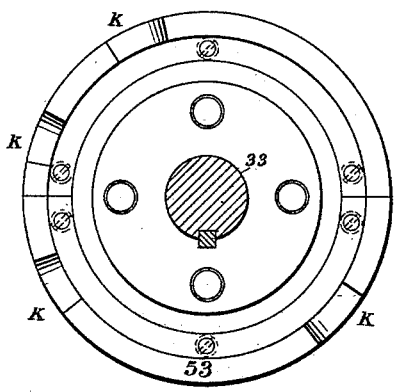
Figure 18:
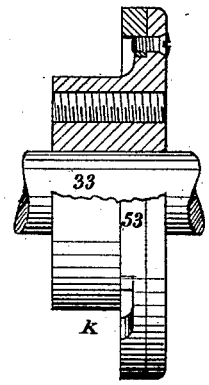

In the drawings, Figure 1 is a longitudinal vertical section on the line A B of Fig. 8. Fig. 2 is an end view. Fig. 3 is a section on the line E F of Fig. 1. Fig. 4 is a rear view with the casing cut away, so as to show a portion of the interior mechanism. Fig. 5 is a transverse section on the line G H of Fig. 4. Fig. 6 is a similar section on line C D of Figs. 1 and 4. Fig. 7 is a plan view on a section taken on the broken line Q R, Fig. 5. Fig. 8 is a plan view looking down upon the top of the machine. Fig. 9 is a view of the die-holder enlarged. It shows the friction-springs which prevent the die from falling out when it is turned radially downward. Fig. 10 is a transverse section on the line J K of Fig. 1, showing the locking-pin which locks the turret; also the lever for drawing the pin. Fig. 11 is a horizontal section on the line L M of Fig. 2, showing a portion of the mechanism for shifting the length of the feed. Figs. 12 and 13 are the feeding and chuck cams respectively developed. Fig. 14 is a vertical transverse section on the line O P of Fig. 1. Fig. 15 is the cam which moves the turret-slide. Fig. 16 is the cam for working the cutting-off tool. Fig. 17 is the turret change-cam, showing the same series of notches—one for each change—shown at Fig. 7. Fig. 18 shows cam of Fig. 17 mounted upon its shaft in front view.

In all prior machines for automatically making metal screws from a long rod of wire, when a change is to be made in the length of the screw-blank to be threaded, or, what is the same thing, if a change is to be made in the length of the feed to be given to the rod of stock, a number of adjustments and manipulations have heretofore been necessary to accommodate existing machines to such new conditions. The time required to make such adjustments is necessarily very great, and as many of the adjustments are independent of but must be correlated to each other, much time must be consumed in making them, involving of necessity a suspension of the operation of the machine in doing work during such period.

In my machine I vary at pleasure the extent to which the rod of stock shall be fed to make all lengths of screws by the simple manipulation of an adjusting device without stopping the machine. This adjusting device is most clearly shown at 1, Fig. 4. It is a nut threaded on its interior and revolves freely between two collars or plates, one of which 2 is a part of a sleeve 3, and the other 4 is a cap-plate secured to the sleeve by holding-screws. Upon the sleeve 3, and radially projecting therefrom, is a fixed stud 5. A fellow stud 6 projects through a long slot in the sleeve and is a part of a bar 7, which can slide longitudinally within the sleeve. The face of this sliding bar is provided with a section of a male screw-thread, which engages with the screw-thread on the interior of the milled nut 1. It is plain that when the nut 1 is turned to the right or to the left the stud 6 will be made to approach toward or to recede from the fellow fixed stud 5 accordingly. Between these two studs there is the upper end of the lever 8, which has its fulcrum at $a$. Its lower end is combined with the grooved cam 9, which is secured to a horizontal shaft 29 and has an intermittent movement. The throw of the cam and the extent of the arc of vibration of the upper end of the lever 8 are proportioned to give a movement to the feeding-tube, hereinafter referred to, for the rod of stock through the distance required for feeding the rod for the longest screw-blank. It follows that the sleeve 3 will partake of the movement of the upper end of lever 8, and will have the same extent of movement in case the studs 5 and 6 are at their nearest approach and in contact, respectively, with the opposite sides of the end of lever 8, lying between the said studs; but if by the turning of the thumb-nut 1 to the left the stud 6 is moved rearward, so as to increase the distance between the confronting faces of the studs, then the distance to which the said sleeve will partake of the movement of the end of the lever 8 will be decreased accordingly, notwithstanding that the arc through which the end of the lever 8 travels is always the same.

Upon the side of the sleeve 3, nearly opposite the studs 5 and 6, is a forked arm 10, (shown more clearly at Fig. 2,) which engages with a groove 11, Fig. 1, in an enlarged head 12 on the end of the spring feeding-tube 13, in the hollow axis of which tube lies the rod of stock. The axis of this spring feeding-tube coincides with the axis of the revolving spindle and holding-chuck of the machine. It follows, therefore, from the foregoing that the feeding-tube must be governed by the movements of the sliding sleeve 3, and that the extent to which the rod of stock in the spring-holding feeding-tube will be fed forward to supply a long or a short blank can be determined at pleasure by the manipulation of the thumb-nut 1 without stopping the machine.

The spring-holding feeding-tube 13, Fig. 1, needs no special description, as it is a well-known device in this class of machines.

The gripping-jaws in my machine for gripping the rod of stock and holding it from rotating within the jaws while its end which is projected beyond the faces of such jaws is being operated upon by the milling or the threading tool are substantially the same in character as the device for a similar purpose known for many years in both wood and metal screw machines. These jaws are worked at the proper times for gripping the rod and for loosening their hold, so as to allow the rod to be fed forward by means of the cam 14, Figs. 3 and 4, which controls the movement of the sliding collar 15, Figs. 1 and 4, through the lever 16. (Shown partly in full and partly in dotted lines at Fig. 4.) This sliding collar interposes a wedge between the tails of levers 17, which actuate the faces of the holding jaws or chuck in a way well understood, and indicated in sectional view at Fig. 1.

The spindle of the machine carrying the holding-chuck, and through the hollow longitudinal axis of which the rod of stock is fed, (shown in section at Fig. 1,) is made to revolve in one direction during the operation of the milling-tools and the threading-tool by means of the pulley 18, driven by a belt, and is made to revolve in the opposite direction during the operation of running off the threading-die and cutting off the finished screw from the rod of stock by means of the pulley 19, driven by a separate belt. Both belts may be run over pulleys on the same counter-shaft, one of them being crossed to give motion to its driven pulley in a direction opposite to that of its fellow pulley on the same spindle. Both of the pulleys 18 and 19 can run loosely on the spindle; but they are capable of being alternately clutched to the spindle, so as to impart to it rotation, first in one and then in the opposite direction, as hereinafter to be next referred to.

The next feature in my machine is the mechanism for causing the spindle to be alternately rotated in opposite directions, whereby time is economized in performing this operation. Instead of fast and loose pulleys with a belt-shipper to change the direction of motion, there are two friction-clutches in combination with these driving-pulleys. When one friction-clutch is in engagement with one pulley, the other is out of engagement. A sliding collar 20 is arranged so as to alternately put the one or the other of the clutches into frictional engagement with its driving-pulley. The details by which this is effected are as follows:

Referring to Figs. 1, 3, 4, 7, and 14, it will be seen in Fig. 14 that the character of the friction-clutch is exhibited in section. Each clutch consists of two half-rings B B, located on the interior of a pulley 18 or 19 to be driven and concentric with its face. When the wedges 21 opposite to each other (shown at Fig. 14) are forced between the beveled ends of the half-rings, it follows that they will be expanded and frictional contact will be secured between their exterior surface and the inner surface of the driving-pulley, and consequently such pulley will be clutched to the spindle, for the reason that the clutching mechanism is splined to and revolves constantly with the spindle. As previously stated, the pulleys themselves are capable of revolving loosely upon the spindle and are made to run in directions opposite to each other, and consequently the direction of rotation of the spindle and its holding-chuck will depend upon which one of the pulleys 18 or 19 is clutched to its shaft. The sleeve 20 for working the friction-clutches is moved to the right or the left by the means shown most clearly at Fig. 4. It will be observed in this figure that there is a cylinder 22 near the bottom of the frame, within which are two coiled springs 23 and 24, which exert their force in directions opposite to each other, the ends of the cylinder against which the springs abut being closed. Each of these springs is pocketed in the hollow piston 25, sliding inside the cylinder 22. In fact, each of these hollow pistons may be said to be the projectile or bolt which is worked by the spring. Upon each of these pistons there is a head-piece c c, like the head of a hammer. When either of these bolts is shot by the recoil of its spring, its hammer-head will strike a pin or projection on the lower end of a lever 26 of the first order, having its fulcrum at d, and instantly vibrate it, for the reason that said lever lies in the path of said bolts. The upper end of this lever is forked and is pivoted to a curved shoe 27, which fits into a groove in the sliding clutch 20. Consequently at the proper moment, to be determined by the operating-cam, the sliding collar 20 will be operated to free one of the clutches and to put into engagement the other, and thus instantly change the direction of rotation of the spindle. Upon the rear end of each of the pistons or bolts 25 there is an upwardly-projecting ear-piece e. The purpose of this is to enable cams 28 to engage with these ear-pieces alternately, and draw backward the hollow bolt to compress the coils of its spring, very much like the way in which the firing-pin of a breech-loading fire-arm is cocked. At Fig. 4 the spring on the left-hand side is contracted, or, in other words, that hollow bolt is cocked. The spring on the right-hand side is extended and has performed its office of shooting its bolt to move the lever 26 so as to clutch the pulley 19 into engagement for running the die off the screw which has been cut, and to give the proper direction of rotation for enabling the cutting-tool to sever the finished screw from the rod. When the time arrives to change the direction of rotation, one of the cams 28 will have revolved so far as to allow the bolt to be released and the lever 26 to be vibrated in the opposite direction, and previously thereto the fellow cam 28 will have cocked the bolt which it controls. The cams to cause the bolts to be cocked and to be shot off are shown in plan view at Fig. 7. The details by which the wedges of the two clutches, respectively, are forced so as to alternately expand the divided friction-rings to make contact with the inner faces of the driving-pulleys when the sliding collar is moved to one side or the other by the vibrating levers 26 of Fig. 4 is best shown in section at Fig. 1, wherein it will be seen that the sliding collar 20 is in engagement with the tails of the two levers h h, so as to force a pair of wedges opposite to each other radially outward and clutch pulley 19 to its shaft. A corresponding pair of levers h' h' will come into action to clutch pulley 18 to the spindle when the sliding collar 20 has been moved in the opposite direction.

The combination of friction-clutches with the driving-pulleys for alternately giving movement to the spindle in opposite directions and the means for instantaneously locking and unlocking the pulleys with their spindle is of great value and importance in securing rapidity of action unaccompanied by that violent slam and tendency to disarrange the machine which results from the employment of the common sliding clutch-boxes. It enables, too, a thread to be cut on the screw-blank up to a head or to a fixed distance with the greatest nicety, and renders unnecessary any devices such as are found in prior machines for causing the threading-die to revolve idly in its holder after its predetermined limit of cut has been reached, so as to prevent cutting too far while the spindle is getting ready to change its direction of rotation.

Another feature of my machine consists in the fact that the revolving spindle, its pulleys for driving it in opposite directions, the friction-clutches for the pulleys, and the means hereinbefore described for adjusting the extent of the feed, and the carriage which carries the cutting-off tool for separating the finished screw from the rod are all mounted on the head-stock of the machine. The bed for supporting these members is shown in section at C, Figs. 2 and 3, and it is independent of the main bed or frame A. It is connected therewith by a dovetail tongue-and-groove connection, so that it can be readily slid longitudinally on the main bed and be held in position by suitable clamp nuts or screws. The object of this arrangement is to bring the face of the revolving chuck into as close relation as possible with the intermittingly-revolving turret-head, which carries the series of milling-tools and the threading-tool, so that when the machine is adjusted from cutting a screw with a long shank to one with a short shank the revolving turret-head, which has also a longitudinal sliding movement, shall not be obliged to consume time in traveling over any unnecessary space to reach the rod of stock projected beyond the face of the holding jaws or chuck.

Although the shafts upon which the operating-cams for working the gripping-jaws and for controlling the movements of the sliding collar to work the clutches and the cam for setting the feed mechanism into action are not attached to this adjustable head-stock, provision can be easily made for allowing such cams to be slipped along their shafts by means of the common spline-connection, so as to preserve their proper relation to the parts which they operate corresponding with any adjustment which may be made of the head-stock relatively to the turret-head.

All the above cams referred to are spline-connected with their respective shafts. Each cam is provided with a hub, as indicated at Figs. 4 and 7, and through these hubs set-screws are inserted, the heads of which are shown plainly in the drawings. The cylinder 22, (shown at Figs. 3, 4, 7, and 14,) containing the coiled springs 23 and 24 for alternately working the pistons or bolts 25 to vibrate the lever 26 to change the direction of rotation of the spindle, as heretofore described, is bolted to the main frame, as shown in section at Fig. 14. The holes in the frame through which the bolts pass are elongated in the direction of their horizontal diameters, so as to form slides, as indicated by dotted lines at Fig. 7, whereby the adjustment of the position of the cylinder can be easily effected. Inasmuch as the levers which are to be operated by the adjustable cams and by the shooting-bolts 25 are all mounted on the adjustable head-stock, it follows that the co-operating members will work in harmony for every change of adjustment in position of which the cams and cylinders are capable.

In case the length of the rod of stock for making short metal screws projects only a short distance beyond the jaw of the chuck it is desirable to have as little space as possible existing between the end of the rod of stock and the face of the tool in the turret-head, in order not to waste time in carrying up the tool to meet the end of the stock. If a long metal screw is to be made, the distance necessarily between the front of the head of the chuck and the face of the tool will be greater; but the distance through which the sliding turret-head is obliged to travel to come into action upon the screws, whether long or short, is no greater when a short screw is being made than when a long one is being made, in consequence of the means of adjustment above described.

Another feature of my machine consists in the employment of a cam-shaft which has an intermittent rotary motion, and upon which are mounted the appropriate cams for giving a backward movement to the cutting-off tool for releasing the gripping-jaws, for feeding forward the stock, for operating the closing of the gripping-jaws in the chuck, and for moving back the feeding-tube for taking a new grip upon the rod of stock. This shaft is shown at 29, Fig. 7. It makes one complete revolution, during which time it performs, through the cams mounted thereon, the offices above mentioned and then comes to a state of rest. The order of its action is as follows: Its first effect is to move backward through the cam 30 the cutting-off tool hereinafter to be referred to, and which is mounted on a carriage moving at right angles with the axis of the screw which is being cut; secondly, it opens, through the cam 14, the jaws of the chuck to give a free passage through the chuck for the rod of stock for the next screw-blank; thirdly, through the cam 9, it feeds forward the rod of stock the prescribed distance determined for it. Then, holding for a moment the rod of stock in that position, through the aid of the spring feeding-tube, it then closes the gripping-jaws through the cam 14, and, lastly, through the cam 9, the feeding device is moved backward to its extreme rearward position. The shaft then stops. The development of the cams 9 and 14 will be seen at Figs. 12 and 13. It is not to be implied that each one of these movements must be absolutely finished before the next movement begins. More than one of them may be carried on cotemporaneously; but the series of operations are in the order as stated.

So far as I am aware, in all former machines for automatically making metal screws the cam-shaft upon which the cams are mounted to perform these several operations hereinbefore mentioned is in continuous rotation, and consequently the necessity for waiting for time is involved, or else such a speed of rotation must be given to the shaft carrying these cams as would be injurious to other parts of the machine having movements dependent upon it. Consequently by assigning a separate shaft for these cams mentioned and giving it an intermittent movement, so that cams upon other shafts while it is at rest can perform their offices at a lower rate of speed, important economical results are secured.

In my machine, as in others previously known of its class, a turret-head 30 is employed, Figs. 1, 6, and 8. Radially projecting from this head are the tools for milling the rod and the die for cutting the thread. This turret-head has an intermittent rotary motion to bring each tool in succession, so that its axis shall coincide with the axis of the rod of stock upon which it is to work, and the turret-head itself, with its tools, is also mounted upon a carriage, so that it can be moved to and fro lengthwise of the bed of the machine.

Each tool remains in position, as in former machines, long enough to perform its particular office on the rod of stock. The turret-head and the carriage upon which it is mounted are shown in plan view at Fig. 8. The carriage is mounted on ways, so that it can slide therein in a direction lengthwise of the bed of the machine, and its rearward movement is effected by means of a strap 31, passing over an anti-friction wheel, Fig. 1, and a weight or spring combined with this strap tends always to pull the carriage rearward in a well-understood way. The forward movements of the carriage are obtained from a cam 32. (Shown, also, in full view at Fig. 15.) The shaft upon which this cam is mounted is 33 at Fig. 7. This shaft is constantly rotating, and is driven, primarily, by the pulley 34, mounted upon a stud, which carries a gear-wheel 35, the teeth of which engage with the fellow gear 36 on the end of the shaft 37. This shaft 37 is the prime-motor shaft for all the operating-cams in the machine. On this shaft 37 is a worm. This worm engages with the worm-wheel 38 on the shaft 33. On the same shaft, and near the opposite end on which the worm-wheel is mounted, is a beveled gear 39, which engages with a fellow beveled gear 40, keyed to the end of the longitudinal shaft 41. Consequently the shafts 33, 37, and 41 are constantly revolving.

Upon the end of longitudinal shaft 37 is a pinion. (Not shown at Fig. 7, because it is overlaid in the drawings by a toothed gear 42, shown in said plan view, but is visible at Fig. 4, and is marked 43.) The gear-wheel 42, Fig. 7, is in constant rotation. Now, as previously stated, the longitudinal shaft 41, Fig. 7, is continually rotating, and it carries the side cam 44, which at the right moment causes the shipper-lever 45, fulcrumed at $f$, (a clearer view is shown at Fig. 5,) to be vibrated. The forward end of this lever 45 is forked, as seen best at Fig. 5, and the fork engages with a groove in the sliding collar 46, which collar has upon its face a pin or clutch-face, which can engage with a recess or corresponding clutch-face on the side of the gear-wheel 42. This sliding collar 46 being spline-connected with the intermittingly-revolving shaft 29, it follows that when the collar 46 is clutched with the gear 42, constantly revolving loosely on the same shaft 29, motion will be given to the shaft 29 and to the cams which it carries for governing the movement of the rod-feeding tube, the opening and closing of the jaws of the chuck, and the movement of the carriage carrying the cutting-off tool. By this combination of the prime-motor shaft 37 with the shaft 29 the intermittent movement of such cam-carrying shaft 29 for performing the functions hereinbefore described is effected.

Let it be supposed, now, that a rod of stock has been fed forward through the revolving chuck for the proper distance to furnish a screw-blank, and that the first milling-tool on the intermittingly-revolving turret-head is about to be brought into action. The shaft 29 is at rest, and the chuck and its spindle are revolving in the right direction under the influence of the driving-belt over the pulley 18, such pulley being this time clutched to the spindle. The cam 32 on shaft 33, Fig. 7, (cam shown at Fig. 15,) works the arm of lever 47, having its fulcrum at *g*. (See Fig. 1.) Upon the axle-shaft of this lever is an arm 48, the end of which is a toothed sector, as shown in dotted lines in said Fig. 1, the teeth of which sector engage with the teeth of a rack 49 on the under side of the sliding carriage 50, which carries the revolving turret-head 30 and advances the first milling-tool radially projected from the turret-head, and having its axis at this time in alignment with the axis of the rod of stock up to the end of the rod and so far onto the same as shall be required for milling the predetermined length of the shank. So soon as the cam 32 permits the lever 47 to be released, the weight or spring, combined with carriage 50 and attached to the strap 31, pulls the sliding turret-head carriage rearward and clear of the rod of stock. If the weight or spring should fail to act, the carriage will be positively moved backward out of the way of the rod of stock by the cam 51, which acts against a short arm 52 on the shaft *g* of the sector-arm 48. This cam 51 is mounted on a transverse shaft 58, which controls the period and times of rotation of the intermittingly-revolving tool-carrying turret-head, and such shaft will presently again be referred to in connection with the description of the means for giving an intermittent rotation to said turret-head. The second milling-tool is next to be brought into action, and preliminary thereto the turret-head must be rotated, say, ninety degrees. The governing-cam is 53 on shaft 33, Fig. 7. (See, also, the face view of the cam at Fig. 17.) It is fast to shaft 33, and consequently is always revolving. It has been previously stated that the gear-wheel 42 is constantly rotating. Now, on the hub of this gear is a sleeve, upon the end of which is a bevel-gear 54. This latter gear drives a fellow bevel-gear 55, mounted loosely on a stud. Combined with this last-named bevel-gear and on the same hub is another gear-wheel 56, the office of which is to communicate movement to a clutch-gear 57, Fig. 6, mounted loosely on the transverse shaft 58. (Shown in the same figure.) In combination with this last-named clutch-gear is a fellow clutch-plate, which can slide on the shaft 58 and is spline-connected therewith. Consequently, when the said clutch-faces are engaged, the shaft 58 will be made to revolve, and the sector or mutilated gear 59 (see, also, Fig. 4) on the end of said shaft will give movement to the shaft 60, Fig. 6, which carries the revolving turret-head, so long as such sector's teeth are in engagement with the teeth of the gear 61 on the end of shaft 60. Thus the shaft 33, Fig. 7, is the prime mover of the gear 61 whenever the train 42 43 54 55 56 57 is clutch-connected to the shaft 58.

Cam 53, Fig. 7, as before stated, is the governing-cam for causing the turret-shaft, Fig. 6, to be put into revolution for a limited time. I will now show its connection with the clutch which makes the connection between the shafts 58 and 33, which latter is driven by the prime-motor shaft 37. A pin 62 (shown at Fig. 6) on the lower end of a lever 63 of the first order, having its fulcrum at *m*, is capable of falling into one of the recesses K, cut in the side face of cam 53. (See, also, Figs. 17 and 18.) The cam 53 is not shown at Fig. 6, which presents the clearest view of the operating-lever 63, for the reason that if shown in edge view it would obscure the lever 63. A spring 64, acting against a spindle 65, placed in the hollow axis of shaft 58, is pinned to the sliding grooved collar 66, Fig. 6, and also to movable half 67 of the clutch-box, which, when closed, will set the turret-shaft 60 into rotation. This spindle 65 must be capable of a longitudinal movement, and collar 66 and clutch 67 will partake of that movement. The upper end of lever 63 is forked and embraces the groove in the sliding collar 66. The tendency of the spring 64 is to move the spindle 65 in a longitudinal direction to the right and cause the clutch-face of 67 to lock with its fellow and set the shaft 58 into rotation. The smooth surface of the periphery of the cam 53, on which the pin 62 of Fig. 7 rides, compresses the spring 64, and therefore holds the clutch-box 67 open, as shown in Fig. 6. When, however, one of the depressions K, Figs. 7, 17, and 18, comes in the revolution of cam 53, under the pin 62, projecting from the shifter-lever 63, it will drop into the same under the influence of the spring 64, which also causes the clutch 67 to close, whereupon the shaft 58 will commence to rotate, because the train heretofore described, which connects it with shaft 33 and with the prime-motor shaft 37, is complete, and the toothed sector 59, Fig. 4, on the end of such shaft will give a partial rotation to the toothed wheel 61 on the end of the turret-shaft 60, and the second tool in series will be brought into alignment with the rod of stock. A spring-detent 68, Fig. 4, drops into the notch 69 and holds the turret-head by arresting its momentum, which is liable to continue for an instant after the cam 53 has again opened the clutch 67.

The turret-head and its shaft should be locked fast after each partial rotation, and this lock should be withdrawn just in advance of the toothed sector 59 coming into action. The device for this purpose is clearly shown at Fig. 6. A rod 70, Fig. 6, is housed in a cylinder on the top of the bearing of the turret-head shaft, and is constantly under a tendency, by means of a spring 71, to enter a hole 72 in the turret-head. (See Fig. 10.) This rod can be withdrawn by the lever 85; the upper end of which enters a notch in the side of the rod, and the lower end rides upon the face of a side cam 73. When the raised face of this cam moves the lower member of the lever 85, the lever will be vibrated inward on its fulcrum and the lock withdrawn. The cam is shown at 74, Fig. 6, and is keyed to the shaft 58, and revolves when the latter revolves. As this shaft commences to revolve before the teeth of the sector 59 come into engagement with the toothed wheel 61, the locking-pin will be withdrawn in advance of the commencement of the revolution of the turret-head. The turret-head having been revolved for, say, ninety degrees, as above described, the carriage on which the turret is mounted is again moved up toward the rod of stock, so that the second milling-tool can come into action. This is effected in the same way as heretofore described, except that the operating-cam is 32', Fig. 15, instead of 32, as in the former case. Inasmuch as the second milling-tool only dresses the shank of the screw-blank with a light cut, it can be moved rapidly, and consequently the cam 32' is shaped to induce a more rapid feeding movement. The second milling operation having been accomplished, and the carriage carrying the turret-head having retreated, the turret-head is revolved another fraction of a circle by the means hereinbefore fully described, and the threading-die is brought into alignment with the rod of stock. It is not desired, as in the case of milling the blank, that the cam which moves forward the carriage shall follow up the carriage and force the tool along the surface of the revolving rod of stock. It is only desired that the die shall be forced far enough to bite the end of the shank of the blank and then feed itself; otherwise the threads of the screw will be liable to be injured. Consequently the cam which moves the carriage forward to enable the threading operation to be commenced is that portion of 32', Fig. 15, marked 75. The die is capable of moving radially outward in its holding-socket in the turret-head, it being spline-connected with such socket, so that it will not turn therein, and thus it can be run onto the shank and cut its thread so long as the spindle is in revolution in the proper direction for that purpose. An enlarged view of the die and holder is shown at Fig. 9, and also a pair of springs 76 for creating sufficient friction to prevent the die from dropping vertically downward out of its socket in the turret-head. The thread having been cut, the next operation of the machine is to reverse the direction of rotation of the spindle and holding-chuck, so that the die may be run off the screw, and also for the purpose of giving the right direction of rotation for the clutch to enable the cutting-off tool to do its work of severing the screw from the rod. The means by which this change of direction of rotation is effected through the instrumentality of cam 28, sliding collar 20, and clutching mechanism for pulleys 18 19 have already been described.

The final operation of the machine is to sever the screw from the rod of stock. A cutting-off tool 77, Fig. 5, is suitably mounted in a post on a sliding carriage 78, which carriage is mounted on the head-stock, so as to run in dovetail ways or guides in a direction at right angles with the longitudinal axis of the head-stock. The cam which induces at the right time the carriage with its tool to move forward is shown at 79, Figs. 5, 7, and 16. It is mounted on shaft 41, Fig. 7, and constantly revolves with it. Turning, now, to Fig. 5, it is clear that when cam 79 acts on the lower member of lever 80, having its fulcrum at $n$, the upper end of such lever, which is furnished with teeth in the form of a sector, and which teeth are in engagement with a rack 81 on the under side of the carriage, will cause the tool-carriage to be advanced, so that the cutting-off tool 77 can sever the screw from the rod. The carriage is caused to retreat before the next feeding forward of the rod of stock occurs by means of the cam 30, Figs. 5 and 7, which is mounted on the intermittingly-revolving shaft 29. Said cam strikes in its revolution the back side of lever 80 and moves it in the right direction for running back the tool-carriage, the cam 79 at this time having moved out of the way.

While the cutting-off tool is in action the threading-die has run off the screw, the carriage carrying the turret-head has been returned to its rearmost position, whereupon the turret-head is revolved another fraction of a circle. In this instance there are only three tools in the turret-head, separated ninety degrees from each other, the space for the fourth tool being left blank. Consequently the machine, as arranged in the drawings, has no provision for a moving forward of the tool-carriage during the time that the socket, which can be occupied by a fourth tool, is in alignment with the revolving chuck. In case such socket were to be occupied by a tool provision would be made for advancing the carriage for such tool to work upon the end of the rod, as in the instances previously described. In this instance the cams are so timed that the turret-head carriage does not commence to advance until the turret-head has been again revolved another ninety degrees, so as to bring the first milling-tool into alignment with a fresh blank. Cotemporaneously with this last partial revolution of the turret-head the direction of rotation of the spindle is changed, and the several operations hereinbefore described are repeated.

I have devised a convenient means for nicely adjusting the position of the cutting-off tool relatively to the rod of stock upon which it is to operate. So far as I am aware, in all previous machines the adjustment of the tool was required to be made by manipulation. In my machine I have constructed the sliding carriage in two parts. One portion is the part marked 78, Fig. 5, upon which the tool is mounted, and the other portion is the member marked 81, which is the rack. This rack is capable of being clamped firmly to the upper portion 78 by means of a clamp-screw 82. In that condition the two members of the bed will be united as one. For the purpose, however, of adjusting nicely the extent to which the tool-carriage should be moved, I make the rack member adjustable relatively to its fellow member 78. On the end of the rack is a threaded shank, upon which is a nut with a milled head 83, the face of which bears against the rear portion of the member 78. This nut 83 has a groove turned in it, into which fits a yoke-plate 84, secured to the end of the member 78. It is apparent that if the clamping thumb-screw 82 be loosened and the thumb-nut 83 be turned to the right or to the left the rack member 81 will be adjusted to different positions relatively to its fellow member 78. Consequently the extent to which the sliding bed carrying the tool-carriage can be moved can be adjusted with the greatest precision.

The several functions which the machine performs are executed, as will be understood from the foregoing detailed description, in the following order: Let it be understood that the rod of screw-stock is ready to be advanced. The cutting-off tool has been moved backward to its rearmost position. The jaws of the chuck have been opened, and a free passage exists through the hollow axis of the spindle and the axis of the jaws for the passage of the rod of stock. The spindle is now revolving in the direction which is induced by the belt passing over the pulley 18. The adjustable feeding mechanism now comes into action, and the rod of stock is fed through the prescribed distance by means of the spring feeding-tube. It is held by the feeding-tube for an instant in the proper position, when the gripping-jaws of the chuck close upon the rod and grip it firmly. It then commences to rotate with the chuck. The feeding-tube is then moved backward to its extreme rearward position, and thereupon the shaft which carries the cams for giving a backward movement to the cutting-off tool, for opening the gripping-jaws, for feeding forward the stock, for operating the closing of the gripping-jaws in the chuck, and for moving back the feeding-tube to its extreme rearward position comes to a state of rest, and so remains until the rod of stock is to be fed forward again to supply a new blank. The first tool in the series of tools arranged upon the intermittingly-revolving turret-head is now advanced and performs its office of milling the shank of the screw-blank. The tool, with its carriage, is then moved backward clear of the rod. Another partial revolution is now given to the turret-head, and the second tool in the series is brought into action, and the shank of the screw-blank receives its final dress. This tool, with its carriage upon which it is mounted, is again moved rearward to its extreme position, and the turret-head makes another partial revolution, so as to bring the threading-die into action to cut the thread on the blank. So soon as the limit of thread has been cut the direction of rotation of the spindle is reversed by releasing the clutch which drives pulley 18 and by clutching pulley 19 to the shaft. The die is thus backed off and the carriage which carries the turret-head finally returned to its rearmost position. Cotemporaneously the cutting-off tool is advanced transversely to the axis of the revolving screw and severs it from the rod. The turret-head is then revolved so as to bring the first milling-tool again into alignment, and all the preceding operations are repeated.

While my machine is intended for making metal screws, it is obvious that it can be employed with advantage for making similar articles which are not screw-threaded—as, for example, pins, which require to have their shanks milled to a diameter smaller than the head, and to be furnished with a conical or other form of point. In such case the threading-die would be omitted and a tool adapted to point the end of the blank would be substituted therefor. It is also obvious that in such case the pointing-tool would not require to be moved onto the blank to the same extent that the milling-tools are moved, and in such case the operating-cam for moving forward the carriage would be modified as to its form to meet such new conditions. So, also, instead of three tools mounted in the turret-head, as described in the present case, a greater number of tools to perform appropriate operations upon the blank can be mounted in the turret-head, which would involve only changes in mechanical construction without altering, essentially, the principle or mode of operation of the machine, a leading characteristic of which machine is that while all the movements of the several cam-shafts are derived from the rotation of pulley 34 as a prime motor an intermittent motion at a relatively higher rate of speed is given to the shaft which controls the gripping-jaws of the chuck, the backing off of the cutting-tool, and the rod-feeding mechanism, whereby a great economy in point of time in the operation of the machine is effected.

While I have described particularly the several cams, levers, and other mechanical devices for accomplishing the movements of my machine, I do not limit myself to the employment precisely of such elements or mechanical powers; but I mean to include all formal variations or known substitutes for the same performing the same mode of operation by equivalent means.

What I claim as my invention, and desire to secure by Letters Patent, is—

1. The combination, substantially as hereinbefore set forth, of a hollow rotating spindle and its holding-chuck for a rod of stock, a spring feeding-tube for such rod, a sliding sleeve connected with said tube, lugs for working said sleeve, which are adjustable relatively to each other, and a vibrating feeding-lever having a fixed range of movement, whereby any extent of movement equal to or within that of the feeding-lever can be imparted to the spring feeding-tube at pleasure.

2. For the instantaneous reversal of the direction of rotation of the spindle and its holding-chuck, the combination, substantially as hereinbefore set forth, of two pulleys arranged to revolve on said spindle in opposite directions, friction-clutch devices for alternately connecting each of said pulleys to the spindle, a sliding collar for working and releasing such clutches alternately, and spring-bolts for alternately vibrating the lever which slides such collar, said spring-bolts being retracted, held, and allowed to be shot off by means of operating-cams, substantially as described.

3. The combination of two spring-bolts arranged to be shot in directions opposite to each other, devices, such as revolving cams, for retracting such spring-bolts and allowing them to be alternately projected by their springs, and a shipper-lever arranged to vibrate on a fulcrum, one end of such lever being located in the path of movement of both spring-bolts, substantially as described.

4. The combination, with the main frame of the machine and with the sliding carriage carrying the turret-head and its tools, of an independent bed carrying the revolving spindle and its chuck, the pulleys for rotating the same alternately in different directions, the clutches for said pulleys, the adjustable spring feeding-tube, and the sliding cutting-off tool, said bed being arranged to be adjustable on the main frame in positions nearer to or farther from the faces of the tools carried by the turret-head and its sliding carriage, substantially as described.

5. The combination, substantially as hereinbefore set forth, of the prime-motor shaft 37, the shaft 29, (carrying the cams for governing the movements of the rod-feeding tube, the opening and the closing of the jaws of the chuck, and for the retreating movement of the cutting-off-tool carriage,) and an automatic clutch-coupling mechanism controlled by a shaft in train with the prime motor, whereby an intermittent movement can be given to said shaft 29, for the purposes described.

6. The combination, substantially as hereinbefore set forth, of the prime-motor shaft 37, the cam 53, driven therefrom, the shaft 58, and an automatic clutch-coupling mechanism controlled by the cam 53 in train with the prime motor, whereby an intermittent movement can be imparted to the turret-head shaft 60 at any desired rate of speed relatively to the speed of the prime-motor shaft, for the purposes described.

7. The combination of the intermittently-revolving shaft 58, the cam 74, the turret-head carrying the series of operating-tools, and the locking-pin 70, substantially as described.

8. In combination with the revolving spindle of a screw-machine, the sliding cutting-off-tool carriage constructed with a rack, through which a sliding movement is communicated to the carriage, which rack is adjustable in position relatively to the bed of the carriage by means of an adjusting device, as described, whereby the adjustment of the movement of the cutter relatively to the axis of the revolving spindle holding the rod of screw-stock can be accurately effected.

9. The combination, in a metal-screw machine, of a sliding turret-head carrying a screw-cutting die held against revolving in the head, a revolving spindle carrying the chuck for holding the rod of screw-stock, the said revolving spindle being arranged by means of pulleys revolving in opposite directions and alternately clutched to said spindle, to revolve, first, in the direction for allowing the thread to be cut by the non-rotating die, and, secondly, to revolve in the opposite direction for running off the threader-die, and a sliding cutting-off-tool carriage arranged to move toward the axis of the rod of stock when the die is backing off, whereby the operations of backing off and severing the screw from the stock can be performed practically simultaneously.

10. The combination, with the spindle of a screw-machine capable of revolving first in one and then in the opposite direction, of a screw-cutting die held against rotation in a sliding turret-head, a sliding turret-head, a weight or equivalent means for giving a backward movement to said head, and a cam for giving a forward movement to said head and permitting a movement at the proper time in the opposite direction, whereby the screw-cutting die is by the forward movement of the turret-head forced to take a bite on the blank to be threaded, then allowed to project itself from the turret to feed itself along the blank for cutting the prescribed length of thread, and, finally, on the reversal of the movement of the spindle and the backing off of the die, be returned into the head, and the head itself with the die housed therein moved backward to its rearmost position, substantially as described.

SAML. L. WORSLEY.

Witnesses:
W. H. THURSTON,
S. J. MURPHY.